United States Patent [19]

Hooper et al.

[11] Patent Number: 4,488,834
[45] Date of Patent: Dec. 18, 1984

[54] METHOD FOR USING SALT DEPOSITS FOR STORAGE

[75] Inventors: Mark W. Hooper, Houston, Tex.; Edward J. Voorhees, Tulsa, Okla.

[73] Assignee: Empak, Inc., Houston, Tex.

[21] Appl. No.: 442,377

[22] Filed: Nov. 17, 1982

[51] Int. Cl.³ .............................................. B65G 5/00
[52] U.S. Cl. ........................................ 405/58; 405/55; 405/53
[58] Field of Search .................................... 405/52-59

[56] References Cited

U.S. PATENT DOCUMENTS

| | | | |
|---|---|---|---|
| 2,976,690 | 3/1961 | Allred et al. | 405/58 |
| 3,022,986 | 2/1962 | Brandt | 405/58 X |
| 3,277,654 | 10/1966 | Shiver | 405/59 X |
| 3,552,128 | 1/1971 | Shook | 405/59 |
| 3,613,378 | 10/1971 | Dunlap et al. | 405/55 |
| 3,745,770 | 7/1973 | Fraser et al. | 405/59 |
| 4,365,978 | 12/1982 | Scott | 405/59 X |

Primary Examiner—Dennis L. Taylor
Attorney, Agent, or Firm—Vinson & Elkins

[57] ABSTRACT

A method for developing, evacuating, using, sealing, and re-entering multiple stacked cavities which are created from a single well in salt deposits. The cavities are created in a salt deposit by circulating raw water through concentric casing strings in the well. Each of the cavities is evacuated of liquids prior to use. After storage material is injected into a cavity, the cavity is sealed by setting a plug in the well bore above the top of the cavity. The cavities may be re-entered by drilling out the plug or by drilling a directional well directly into the cavity.

22 Claims, 7 Drawing Figures

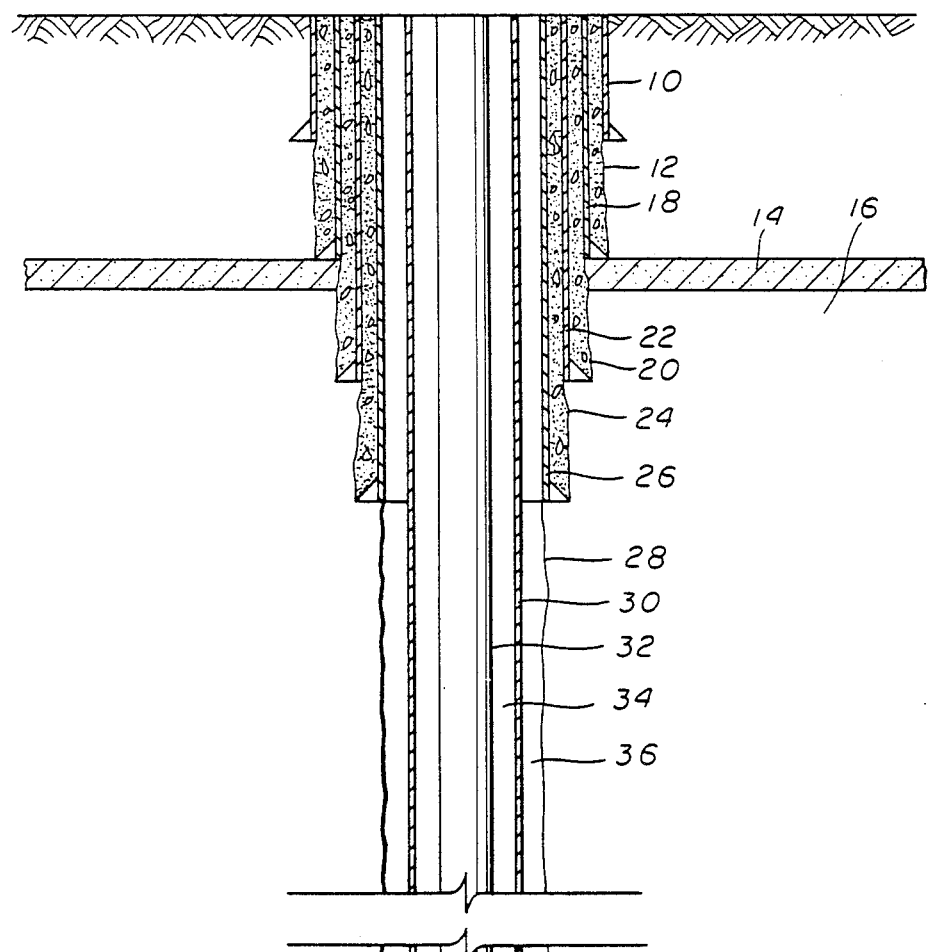
fig.3
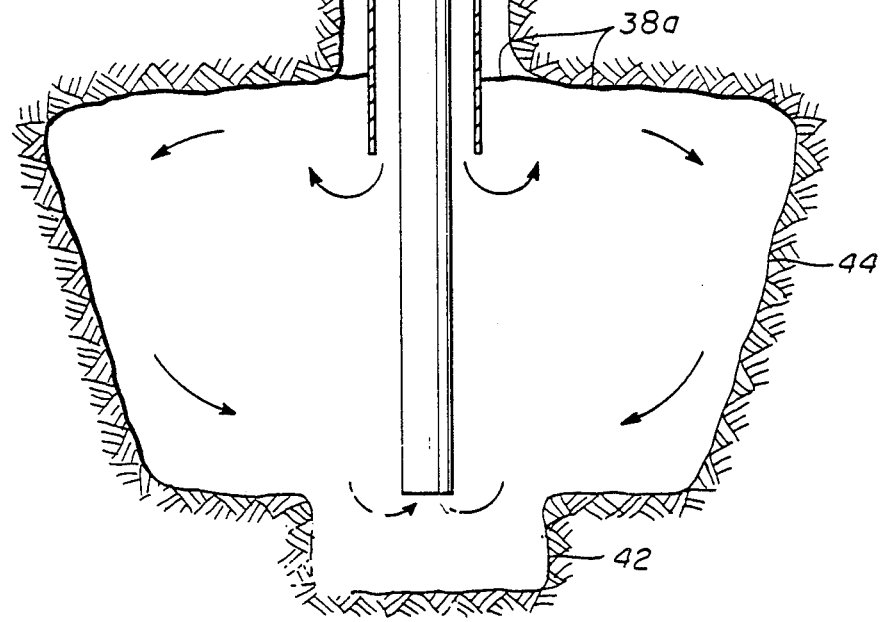

METHOD FOR USING SALT DEPOSITS FOR STORAGE

BACKGROUND OF THE INVENTION

Salt deposits exist as part of many underground geologic structures. Salt deposits can have many geological forms including bedded salt, salt anticlines, and salt piercement structures (diapirs). A specific type of salt diapiric structure is the salt dome. Salt deposits, as utilized herein, include the various underground geologic structures of salt amenable to development of cavities for storage of materials.

There are several properties of salt deposits which make cavities constructed in salt ideal storage sites. First, they are readily accessible generally by drilling a well. Second, cavities or storage spaces can be created at a relatively low cost when compared to surface storage facilities. Third, the salt in salt deposits, unlike most other geological structures, is impermeable to underground flow of liquids, and thus provides a relatively safe media for development of isolated storage receptacles.

For many years storage cavities have been created in salt deposits. Typically, a storage cavity in salt is created by drilling a well into the salt deposit and leaching a cavity by circulating raw water into the salt deposit through the well. Generally, oil, gas and other petroleum products have been stored in these cavities. U.S. Pat. Nos. 3,665,716 and 3,236,053 disclose the storage of waste in salt cavities.

The present invention is the first method for sequentially creating, evacuating, using, sealing, and reentering multiple, isolated stacked storage cavities in salt created from a single well. Although any type of material can be stored in the multiple stacked storage cavities of the present invention, the multiple stacked storage cavities are particularly well suited for storing waste material. The present invention also is the first method for creating, excavating, using and sealing salt cavities.

SUMMARY OF INVENTION

The present invention is for a method of creating, evacuating, using, sealing and reentering multiple stacked storage cavities in salt created from one well. A well is drilled into a salt deposit. A first storage cavity is created by leaching salt from the salt deposit through circulating water in the well. The first storage cavity is evacuated of liquids and then storage materials are injected into it. After the first storage cavity is filled, a plug is set in the well above the first storage cavity thereby sealing the first storage cavity. A second cavity can then be created above the plug by leaching a cavity in the salt deposit through circulating water in the well. This second cavity is evacuated of liquids and is filled by injection. After this second cavity is plugged and sealed, additional cavities can similarly be created, evacuated, used and sealed above the plug for the second storage cavity.

To re-enter a series of plugged cavities, the plug of the upper cavity can be drilled out, the upper cavity can be evacuated, and then the plug for the lower cavity can be drilled. Alternatively, a directional well can be drilled directly to a target re-entry point at the lower part of a cavity thereby not disturbing the other cavities above the re-entered cavity.

An object of the present invention is to provide a method for creating multiple isolated stacked storage cavities in a salt deposit from one well.

Another object of the present invention is to provide a method for creating multiple stacked storage cavities in a salt deposit from a single well for use in waste disposal, which cavities can be sealed from each other, and which cavities can be separately reentered and evacuated after being sealed.

A further object of this invention is to provide a method for sealing one vertically stacked storage cavity in a salt deposit from another vertically stacked storage cavity.

Another object of the present invention is to maximize salt storage cavity stability by breaking the storage volume on each disposal well into a series of storage cavities with dimensions that insure greatest stability.

Still yet another object of this invention is to minimize the capital costs of the storage wells through creation of multiple cavities from each well.

A further object of the present invention is to minimize property acquisition costs by optimizing the storage volume per acre.

Another object of the present invention is to minimize environmental and operating risks by filling and closing each storage cavity within a relatively short period of time.

Still yet another object of the present invention is to provide a method for selectively isolating and storing materials in separate cavities created in salt from a single well.

A further object is to develop vertically stacked salt cavities which can be reentered after sealing for purposes of recovering material.

BRIEF DESCRIPTION OF DRAWINGS

FIG. 3 shows a cross-sectional view of the well during the formation of the first cavity 44. The arrows in the first storage cavity 44 illustrate the general flow of the injection water. However, the flow can be reversed.

DESCRIPTION OF PREFERRED EMBODIMENT

Figure 1:
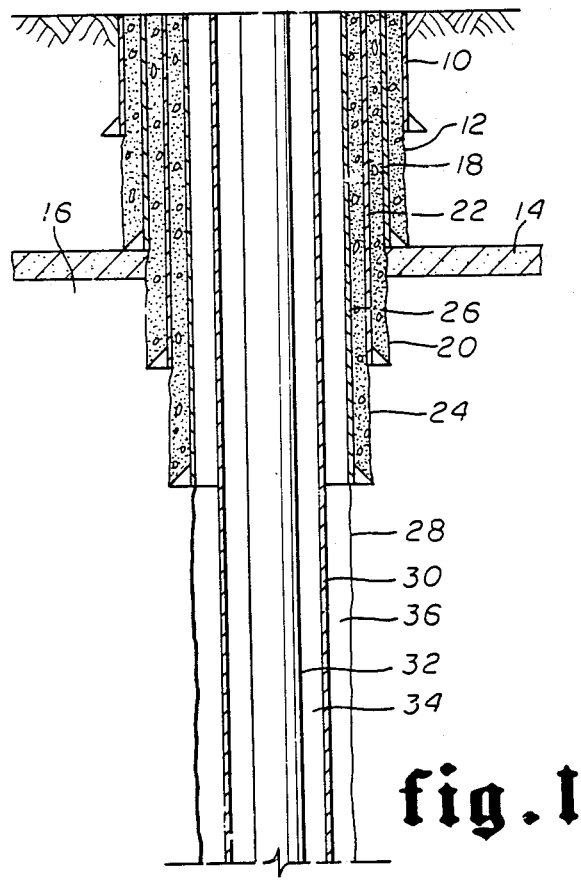
FIG. 1 shows a cross-sectional view of the well drilled into the salt deposit to its total depth.
Figure 2:
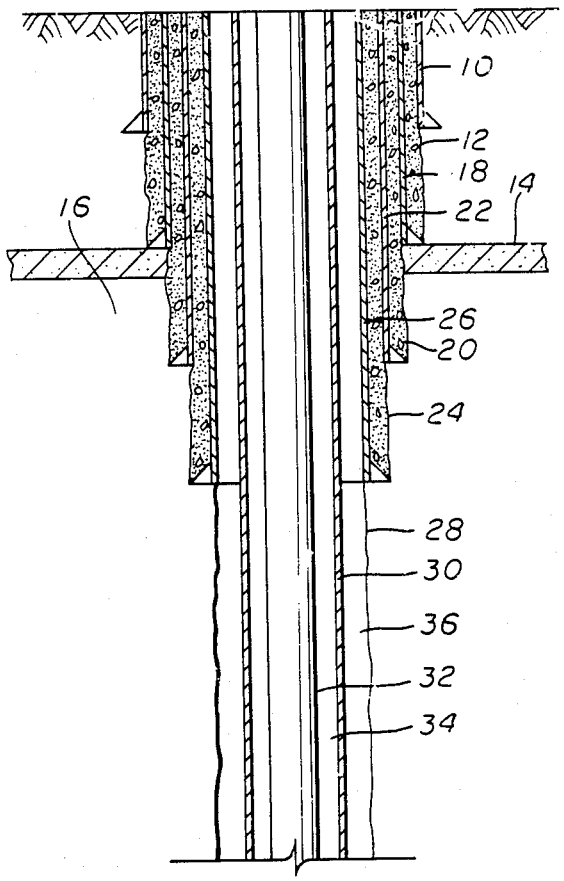
FIG. 2 shows a cross-sectional view of the well after the cylindrical cavity 40 has been formed.

A location is selected for drilling a well into a salt deposit for creation of vertically stacked cavities. The depth of the well and the size of the cavities are selected before drilling begins. Thereafter, a drilling rig (not shown) is moved onto the location and set up for purposes of drilling the well.

Once the rig is set up, a conductor casing string 10 is installed. A hole 12 is drilled inside conductor casing 10 from the surface to the top of the blanket-like zone 14 which may cover the salt deposit 16. In some types of salt deposits, all or part of the top of a salt deposit may be overlayed with a blanket-like zone composed of minerals such as anhydrite, gypsum, limestone and occasionally sulfur. This blanket-like zone sometimes remains after natural leaching of the top layer of salt and is often called cap rock.

After drilling hole 12 to the top of the blanket-like zone 14, casing 18 may be run into the hole so as to extend from the surface to the top of this blanket-like zone 14. A volume of cement is pumped and displaced through the bore of casing 18 and around the bottom of casing 18 and into the annulus formed between the outside of casing 18 and hole 12 so as to fill that annulus. The cement in the annulus bonds the casing 18 to hole 12 as well as isolating the geological formations penetrated by hole 12 from each other.

After casing 18 is cemented, the well is deepened by drilling hole 20 from the bottom of casing 18 through this blanket-like zone 14 and into the salt deposit 16. The nature and thickness of the blanket-like zone 14, if any, and the properties of the salt in the salt deposit 16 are factors which will determine the need for casing 18 and how deep hole 20 is drilled. Once hole 20 reaches its projected depth, casing string 22 is run into the well so as to extend from the surface to the bottom of hole 20. Once the casing string 22 is in place, a volume of cement is pumped and displaced down the bore of casing 22 and around the bottom of casing 22 and into the annulus between casing 22 and hole 20 and the annulus between casing 22 and casing 18 so as to fill these annular spaces. The purpose of the cement is to bind casing 22 with hole 20 and casing 18.

After casing 22 is cemented in the well, hole 24 is drilled to a deeper depth in the salt deposit 16. When the hole 24 reaches the desired depth, a casing string 26 is run into the well so as to extend from the surface to the bottom of hole 24. After casing 26 is in place, cement is pumped and displaced down the bore of casing 26 and around the bottom of casing 26 and into the annulus between casing 26 and hole 24 and the annulus between casing 26 and casing 22. The cement binds casing 26 with hole 24 and casing 22.

After casing 26 is cemented in the well, the well is extended by drilling hole 28 to the total depth of the well. The blanket casing 30 is run into the well to extend from the surface to a depth below the bottom of casing 26 and above the bottom of hole 28. The bottom placement of the blanket casing 30 is a function of the shape design of the cavity to be formed. Inside blanket casing string 30 is run leaching casing 32 which extends from the surface to the bottom of hole 28.

The various casing strings 18, 22, 26, 30 and 32 are supported or hung at the surface by conventional means such as by casing slips and hangers. The well head assembly (not shown) is also a conventional assembly which allows access to each annulus formed between each pair of concentric casing strings. Specifically, the well head assembly is connected to allow access into the leaching casing 32, the leaching casing annulus 34 formed between the leaching casing 32 and the blanket casing 30, and the blanket casing annulus 36 formed between the blanket casing 30 and the hole 28 and the blanket casing 30 and the casing 26. The casing strings 18, 22, 26, 30 and 32 can be designed from the many types of tubing, casing and pipe used in wells, and are concentric.

During the drilling of the well and the various holes 12, 20, 24, and 28, the well is drilled with conventional drilling mud with the particular characteristics of the drilling mud dependent upon the characteristics of the formations and other conditions encountered in the well. Prior to running blanket casing 30 and leaching casing 32, the drilling mud is completely displaced from the well with saturated brine water. The mud can be displaced by running drill pipe to the bottom of the well, pumping brine water down the drill pipe, and circulating the mud out through the annulus of the drill pipe and casing 26. Since the water is saturated with brine, there is a minimum of dissolution of the salt in the salt deposit 16 which comes into contact with the saturated brine water.

After the blanket casing 30 and leaching casing 32 are run into the well, the rig is released and blanket fluid is pumped down the blanket casing annulus 36 displacing the saturated brine solution from the annulus. The blanket fluid is pumped down the blanket casing annulus 36 until a blanket fluid/saturated brine water interface 38 is established at the bottom of blanket casing 30. The blanket fluid can be any noncorrosive fluid, such as propane, butane, diesel oil or crude oil, which is lighter than water. The primary purpose of the blanket fluid is to prevent uncontrolled leaching of the top of the cavity as hereinafter set forth in more detail.

Raw water is injected down the leaching casing 32 around the bottom and exterior of leaching casing 32 and up through the leaching casing annulus 34. Raw water can be any type of water in which salt from the salt deposit is soluble. The raw water displaces the saturated brine water which is in the well. As the raw water circulates around the bottom and outside of the leaching casing 32, it dissolves the salt in the salt deposit 16 that it encounters thereby creating a roughly cylindrically shaped core cavity 40 with a diameter much greater than the diameter of hole 28. The upper part of the roughly cylindrically shaped cavity 40 will eventually be enlarged to create a first cavity 44 as set forth in more detail herein. The bottom part of this roughly cylindrical chamber is sump 42. Sump 42 serves as a receptacle for insolubles which collect at the bottom of the well when the first storage cavity 44 is created.

Once the core cavity 40 is formed to the desired dimensions, a rig is moved on location and the leaching casing 32 is pulled up the hole so that the bottom of the leaching casing 32 is at the top of sump 42. The blanket fluid/saturated brine water interface is reestablished in blanket casing annulus 36 at interface 38a which is up the hole from interface 38. The rig is then released. Raw water is then injected into leaching casing annulus 34 and circulated through the leaching casing 32. As the raw water is discharged from the end of leaching casing annulus 34, the raw water has a tendency to rise along the exterior of blanket casing 30 until encountering the interface 38a with the blanket fluid. The injected raw water rises because the density of the injected raw water is less than the density of the saturated brine water in the well. As the water circulates, it dissolves the salt in the salt deposit which it encounters thereby enlarging the upper part of cavity 40 and creating a first storage cavity 44. The water circulates in the cavity and around the bottom and up through the leaching casing 32. The water does not circulate to any great degree through the sump 42 which is the bottom of cavity 40. Rather, any insoluble material which cannot be dissolved in the raw water drops to and collects in the sump 42.

During the formation of first cavity 44, there is regular monitoring of the blanket fluid/water interface 38a to insure that the top of the first cavity 44 is maintained at the desired depth. Additional amounts of the blanket fluid may need to be added as the first cavity 44 is enlarged. The level of the interface is checked periodically by various methods such as by a wire line density tool.

In a typical formation of a first cavity 44, the well is surveyed at least once during formation to insure that the size and shape of cavity desired is being formed. A rig is moved on location and the leaching casing 32 is pulled up the hole so that the bottom of the leaching casing 32 is at the same depth as the bottom of blanket casing 30. A sonar caliper survey is run into the well and down into the first cavity 44 and sump 42 to determine if the first cavity 44 is being formed or has been formed to the desired dimensions. If further formation of first cavity 44 is necessary, then the leaching casing 32 is repositioned to the position shown on FIG. 3 by running the leaching casing 32 back into the hole 28, the rig is released, and further injection of raw water down blanket casing annulus 34 is reinstituted until the first cavity 44 is formed to the desired dimensions.

Throughout the entire formation of the first cavity 44 and the sump 42, the brine which is circulated out of the leaching casing 32 is continuously analyzed to determine the amount of salt dissolved in the raw water and thus being removed from the salt deposit 16.

When the required cavern volume of first cavity 44 has been leached, the blanket fluid is displaced out of the well with saturated brine. A rig is moved on location and the leaching casing 32 and blanket casing 30 are then retrieved from the well and a final sonar survey is run on the first cavity 44 to insure that the dimensions of first cavity 44 are the dimensions that are desired. A hydraulic test is run on the first cavity 44 to insure that the cavity does not leak.

An important feature of the present invention is that the size of the first cavity 44 when fully leached can be small relative to the size of salt cavities created by other methods and still not necessarily reduce the ultimate overall storage volume in the well. Prior to the present invention, the entire storage volume for a well was created before any storage occurred or during storage. The former would require a considerable amount of time to leach out the large volume and a considerable monetary investment in the operation prior to initiating any revenue generating storage. The latter is utilized in cyclical storage situations where the stored material is lighter than water.

In contrast, under the present invention, a relatively small storage volume can be selected for the first cavity 44. The leaching process would thus be relatively short, and storage could be initiated relatively soon. Then, if desired, larger cavities could thereafter be made from the same well, thereby increasing the ultimate storage volume for the well.

Furthermore, the use of a series of small cavities is more advantageous than the use of one large cavity in that a small cavity tends to be more stable than a large cavity, especially when it is operated at lower pressures.

Figure 4:
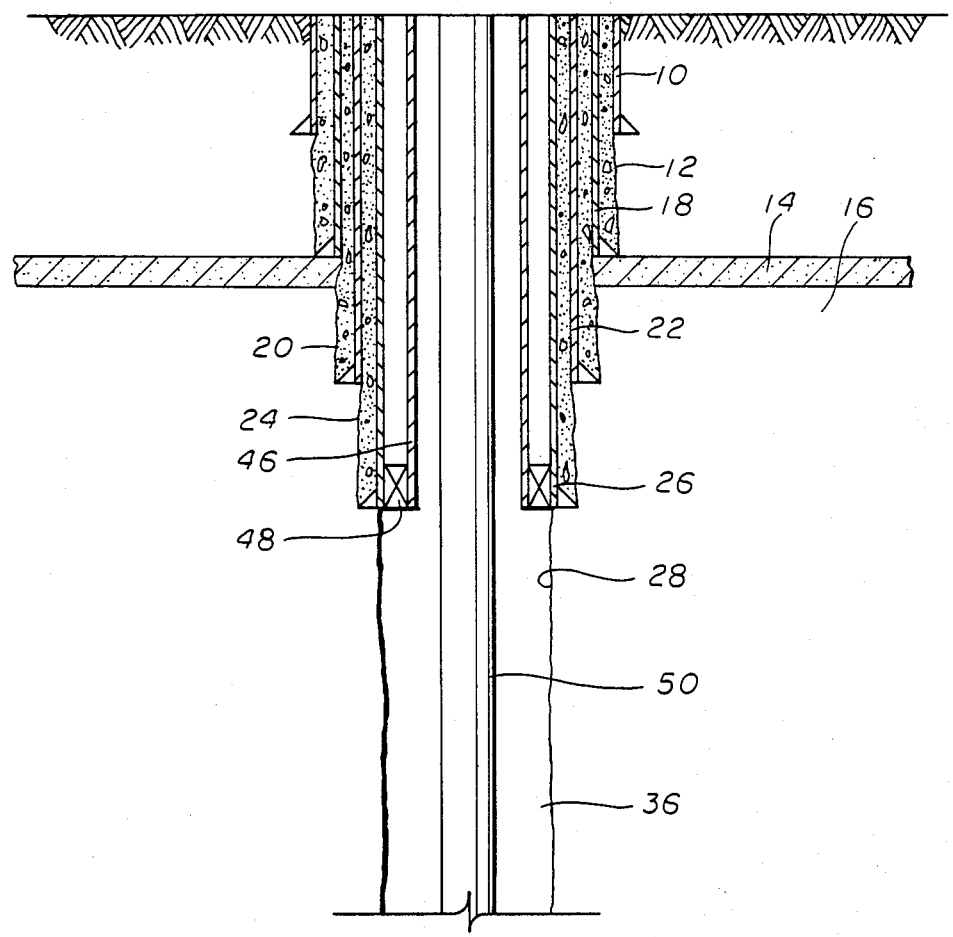
FIG. 4 shows a cross-sectional view of the well with dewatering casing in place.
Figure 4:
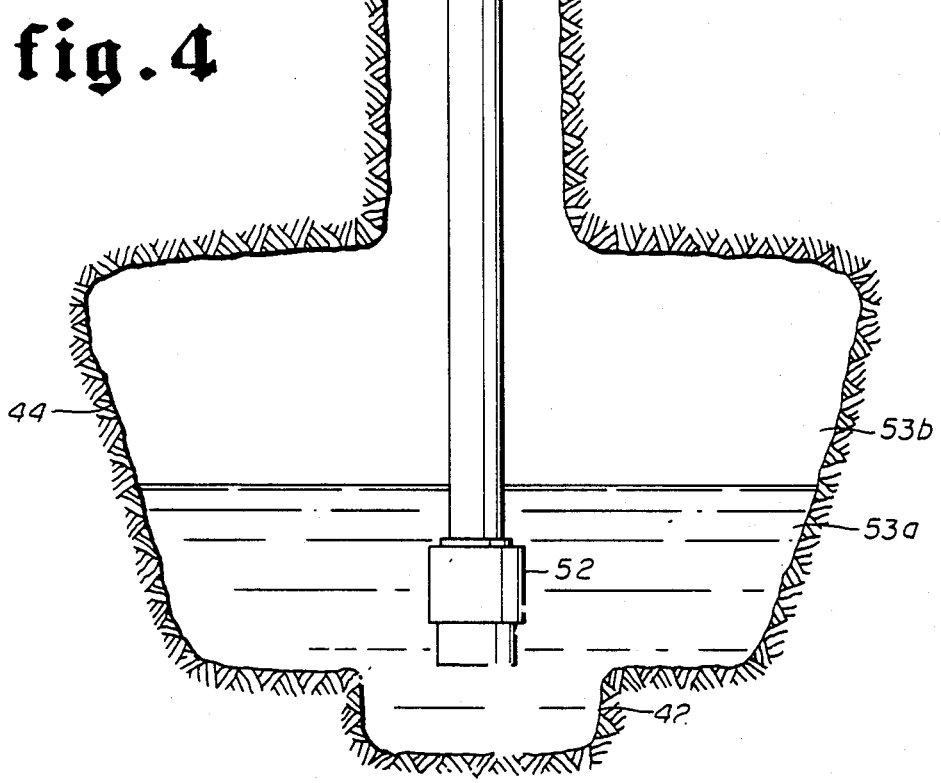

After first cavity 44 is formed, liner casing 46 with packoff means composed of packer 48 on the bottom is run into the well (See FIG. 4). Packer 8 is set at or near the bottom of casing 26, thereby sealing off the annulus between casing 46 and casing 26. Dewatering casing 50 is then run into the well and into first cavity 44 with pump means composed of a submersible electric pump 52 and cable (not shown) being attached to the bottom of dewatering casing 50. Once the dewatering casing 50 is run, the rig can be released from the location. With the dewatering casing 50 in position, the first storage cavity 44 can be evacuated of liquid 53a, leaving only air or other gas in gas cap 53b at less than lithostatic or overburden pressure in first storage cavity 44.

Evacuation by use of pump means such as submersible electric pump 52 is but one example of evacuating first cavity 44. First cavity 44 could be evacuated by injecting gas into the cavity under pressure thereby forcing liquids out of the first cavity 44 through a tubing string. Another method of evacuating the cavity could be through running a tubing string with a gas lift valves into the first cavity 44 and evacuating first cavity 44 by conventional gas lift. There are numerous other methods of evacuating first storage cavity 44 and all these methods fall within the scope of the present invention.

When the first storage cavity 44 has been evacuated, a rig is moved on location and the dewatering casing 50 with pump 52 is removed from the well. Injection casing 54 is run into the well and the rig is released. Storage material can then be injected into the cavity down injection casing 54.

Figure 5:
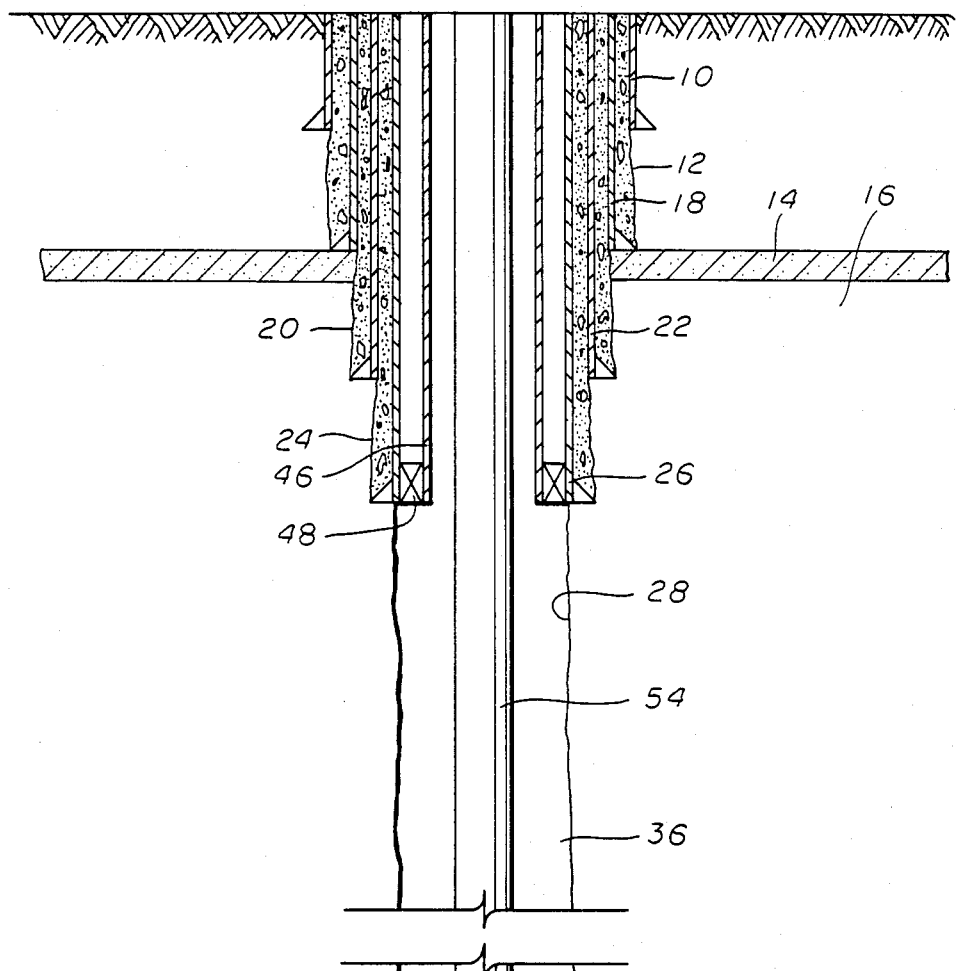
FIG. 5 shows a cross-sectional view of the well with waste being injected into it.
Figure 5:
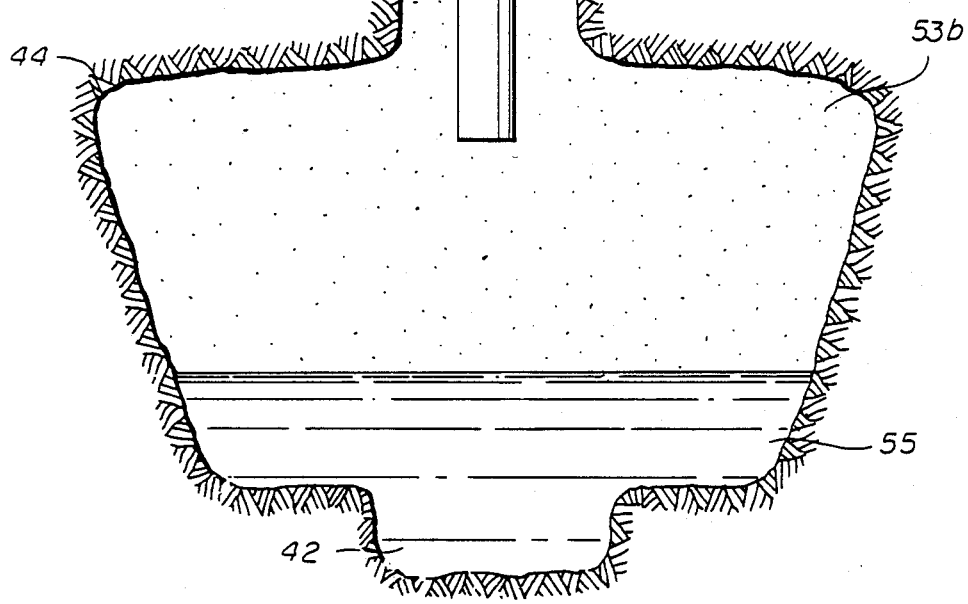

One of the important elements of the present invention is the injection of material into a cavity which contains gas at less than lithostatic pressure. In the preferred embodiment of the present invention, a pressure is maintained in the cavity by a gas cap 53b as waste 55 is injected down dewatering casing 50 (See FIG. 5). The gas cap 53b is created and maintained by gas injection into the annulus between casing 46 and injection casing 54. The gas which is injected can be selected from a wide variety of gases. For economic reasons, nitrogen or natural gas are particularly well suited for injection. The pressure maintained by the gas can vary from 0 psia to near lithostatic pressure based on the depth of first storage cavity 44. Generally, the pressure will be in the range of a few atmospheres to 100 atmospheres.

The use of a gas cap in the cavity 44 during waste injection has several advantages. It minimizes the amount of return material that must be handled at the surface as the first storage cavity 44 fills. As first storage cavity 44 fills with waste injection, gas from gas cap 53b can be discharged and monitored through the annulus between injection string 54 and casing 46. Further, prior to injection, only a relatively small amount of gas needs to be injected into the cavity 44 in order to fill it to the desired pressure of less than 100 atmospheres.

Figure 6:
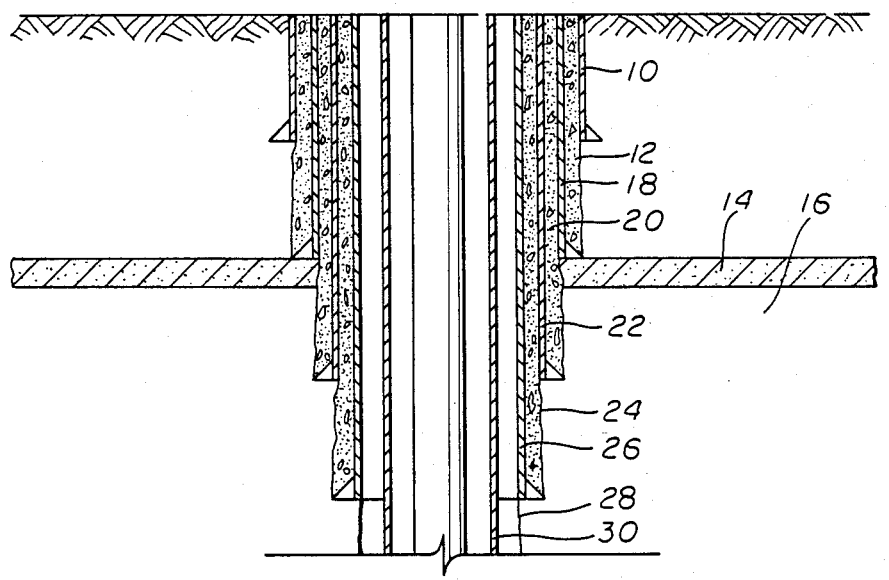
FIG. 6 shows a cross-sectional view of the well after the first cavity has been plugged and during formation of cylindrical cavity 60.
Figure 6:
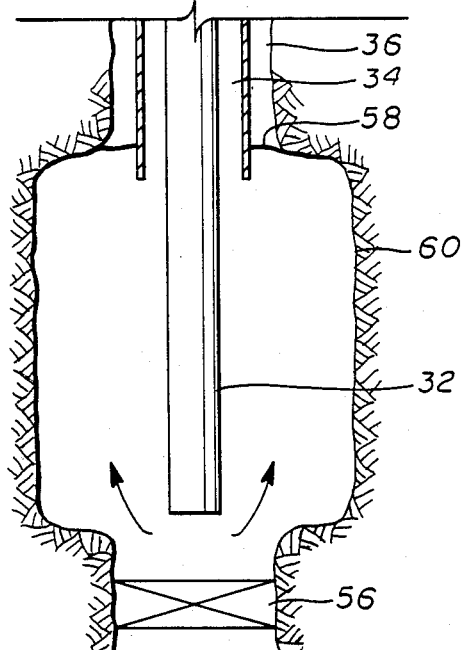
Figure 6:
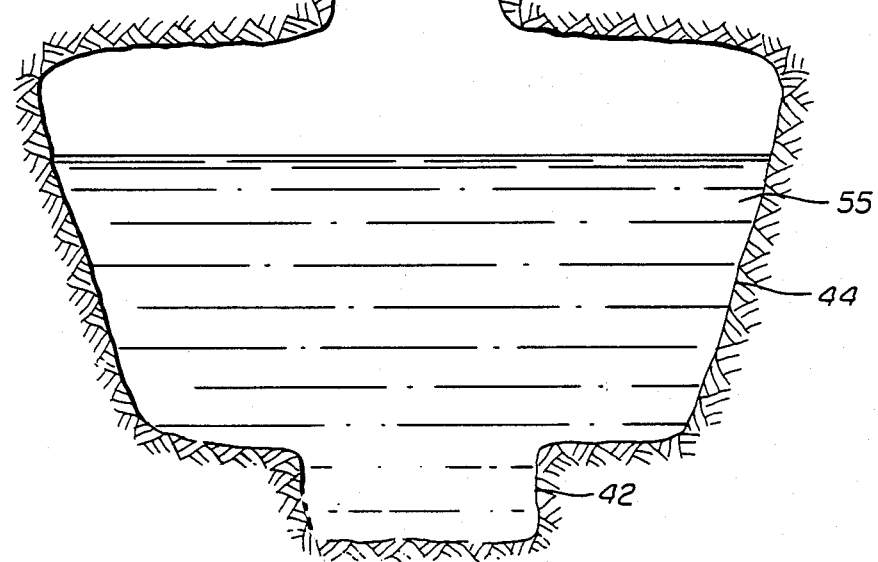
Figure 7:
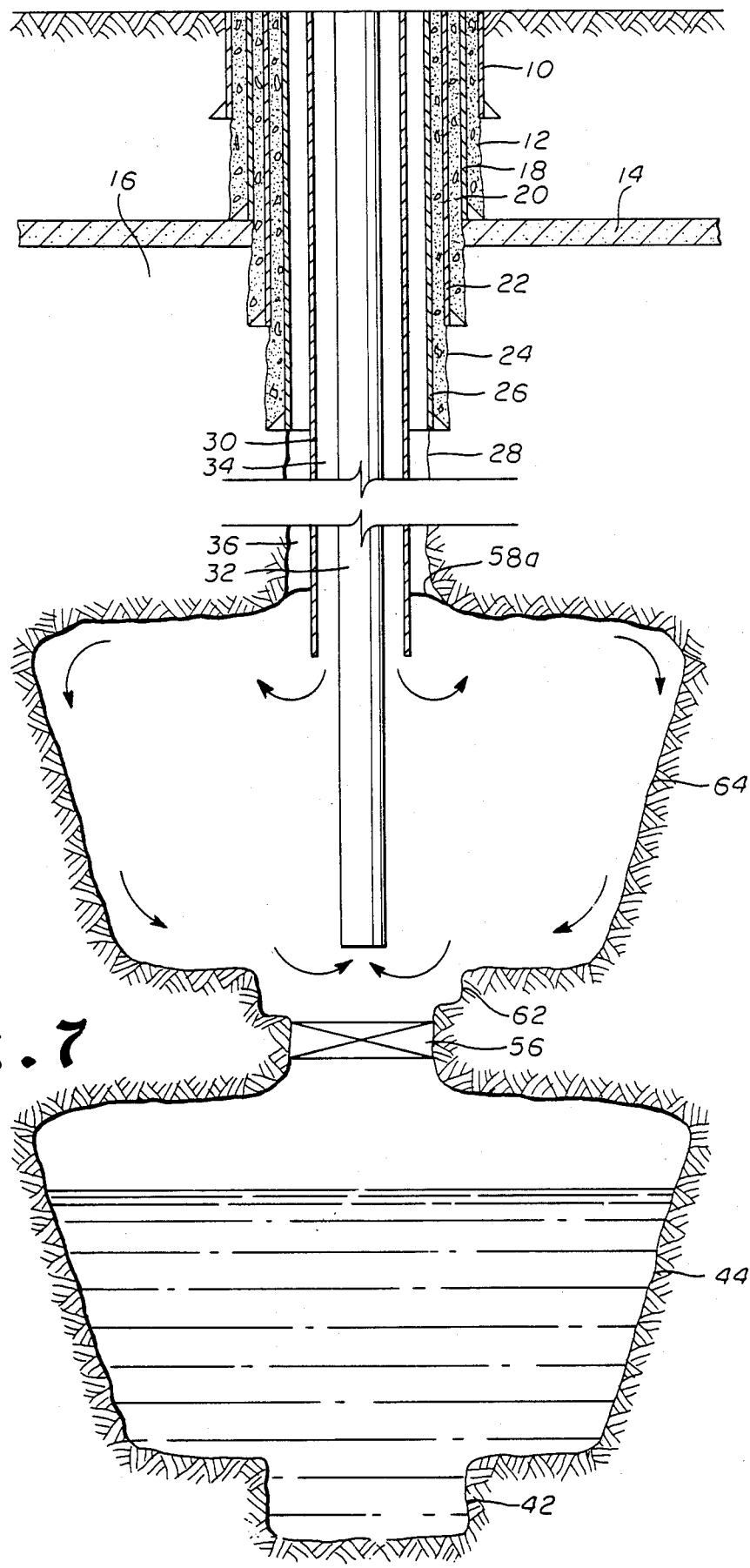
FIG. 7 shows a cross-sectional view of the well after the second storage cavity 64 has been formed.

After the first storage cavity 44 has been filled with waste material, a rig is moved on location. The well is filled with saturated brine and the injection casing 54 and casing 46 with packer 48 are removed by the rig. A caliper log is run in hole 28 to a depth above the top of first storage cavity 44 to determine the diameter and condition of hole 28 at that depth. A cementing casing string is then run into the hole 28 with the bottom being positioned at the depth which had been surveyed by the caliper log. A cement slurry in pumped into the casing and out of the casing so as to leave a column of cement or plug of cement 56 (see FIG. 6) in the hole 28 immediately above the top of first storage cavity 44. Generally, a fifty foot column of cement is a sufficient amount of cement plug 56 to seal the first storage cavity 44. The casing string is then positioned above the top of the cement plug 56 and circulation of fluid through the casing string and annulus is commenced to check for contaminants in an effort to evaluate the effectiveness of the plug. The fluid can be periodically or continuously circulated for a sufficient period of time to evaluate the plug.

Once the plug 56 has been proven satisfactory, a second storage cavity can be formed in the well by generally following the same procedure used in creating the first storage cavity. To insure that there is no communication between the cavities, the bottom of the second storage cavity should be a sufficient distance above the top of the first storage cavity 44 such as two hundred and fifty feet.

To form a second storage cavity, the blanket casing 30 is run into the hole so as to extend from the surface to a depth below the bottom of casing 26. The bottom placement of the blanket casing 30 is a function of the shape design of the second storage cavity to be formed. Inside blanket casing string 30 is run the leaching casing 32 which extends from the surface to a depth above the plug 56. The bottom of the leaching casing 32 should be positioned above the top of plug 56 to develop the sump. During the running of the blanket casing 30 and leaching casing 32 the well is filled with saturated brine water. The rig is then released from the well.

Blanket fluid is pumped down the isolation blanket casing annulus 36 formed between blanket casing 30 and hole 28 and casing 26. The blanket fluid is pumped down the blanket casing annulus 36 until a blanket fluid/saturated brine water interface 58 is formed at the bottom of blanket casing 30 (see FIG. 6). The blanket fluid can be any of the wide range of noncorrosive liquids previously mentioned.

Raw water is injected down the leaching casing 32 around the bottom of leaching casing 32 and up through the leaching casing annulus 34. As the fresh water circulates, a cylindrically shaped cavity 60 is created with a diameter much greater than the diameter of hole 28. The upper part of this cylindrically shaped core cavity 60 will eventually be enlarged to create the second cavity 64. The bottom part of the cylindrical core cavity 60 is sump 62 which serves the same purpose for second cavity 64 as sump 42 serves for the first cavity 44 (see FIG. 6).

Once core cavity 60 is formed, a rig is moved on location and the leaching casing 32 is pulled up the well so that the bottom of leaching casing 32 is at the top of sump 62. The rig is then released. The blanket fluid/saturated brine water interface is reestablished in blanket casing annulus 36 at interface 58a which is up the hole from interface 58. Raw water is then injected into leaching casing annulus 34 and circulated through leaching casing 32. As in the creation of the first cavity 44, the raw water initially rises as it flows out of the bottom of leaching casing annulus 34 due to the density difference between the liquids. The water is circulated through leaching casing 32 carrying out the dissolved salt while insolubles drop into sump 62. The dissolution of the salt creates second storage cavity 64.

During the formation of second storage cavity 64, there is regular monitoring of the blanket fluid/water interface 58a to insure that leaching of the top part of the second storage cavity 64 is controlled. Additional blanket fluid may have to be added as the second storage cavity 64 is created.

As in the creation of the first storage cavity 44, the second cavity 64 can be surveyed by sonar survey or other means during formation to insure that the desired size and shape of the cavity is being formed. The water discharged at the surface from leaching casing 32 is continuously analyzed to determine the amount of salt dissolved in the fresh water.

When the second storage cavity 64 has been created, the blanket fluid is displaced out of the well with saturated brine. A rig is moved on location and the leaching casing 32 and blanket casing 30 are then retrieved from the well and a final sonar survey is run on the second storage cavity 64 to insure that the dimensions of the second storage cavity 64 are the dimensions desired. A hydraulic test is run on the second storage cavity 64 to insure that the cavity does not leak.

After the second storage cavity 64 is formed, the dewatering casing is run into the well into the second cavity 64 inside liner casing with a packer on the liner casing set at or near the bottom of casing 26. A submersible electric pump and cable can be attached to the dewatering casing thereby allowing the second cavity 64 to be evacuated of fluid and to be placed in a condition to accept waste injection in the same manner that first storage cavity 44 was evacuated. Similarly, a wide variety of other methods, such as gas displacement or gas lift, could be used to evacuate the second cavity 64. All of these methods fall within the scope of the present invention.

Injection casing is then run into the well and the rig is released. Storage material is then injected into the second storage cavity 64.

As in the injection of material into the first storage cavity 44, a gas cap is maintained on the second storage cavity 64 during injection. The gas cap pressure can range from near 0 psia to near lithostatic pressure for the particular depth. Generally, a pressure of a few to 100 atmospheres will be maintained. Any of a wide variety of gases can be used in the gas cap.

When the second storage cavity 64 has been filled, a plug such as plug 56 can be set in hole 28 above the top of the second cavity 64 and thereafter a third storage cavity can be created. Additional vertically stacked storage cavities can be created and plugged in the same manner from hole 28 depending on the salt deposit vertical interval.

Any of a wide variety of materials can be stored in the multiple stacked cavities of the present invention. The present invention is particularly well suited for storing waste material. Since each cavity is segregated from the other cavities, different materials can be stored in each cavity, permitting potential future recovery of the materials without additional mixing or contamination.

The series of plugged vertically stacked cavities may be reentered by drilling out the plugs or by directionally drilling to a target re-entry point near the bottom of the cavity. If re-entry into the lower cavity in a set of vertically stacked cavities is required, the upper cavity is conventionally re-entered and emptied by pump out or displacement. The lower cavity then can be re-entered by running casing through the upper cavity to its bottom, running a drill string inside the casing, and drilling through the salt or the plug into the next lower cavity.

If re-entry into the lower cavity without disturbing the upper cavity(ies) in a set of vertically stacked segregated cavities is required, re-entry is accomplished by drilling a directionally controlled hole to a target re-entry point near the bottom of the selected cavity. A conventional drilling rig or slant angle rig can be used for the operation, depending upon the depth of the target.

Having now described the invention, many modified embodiments will readily occur to those skilled in the art. Insofar as those modifications do not depart from the spirit and scope of the invention described herein, they are intended to be embraced by the claims in their broadest construction.

What is claimed is:

1. The method of using a salt deposit for storage comprising
   drilling a well into the salt deposit;
   creating a first storage cavity in the salt deposit by circulating raw water through the well;
   evacuating the first storage cavity of all liquids;
   injecting storage material into the first storage cavity;
   sealing the first storage cavity by setting a plug in the well above the top of the first storage cavity;
   creating a second storage cavity in the salt deposit above the plug by circulating raw water through the well;
   evacuating the second storage cavity of all liquids;
   injecting storage material into the second storage cavity;
   sealing the second storage cavity by setting a plug in the well above the top of the second storage cavity;
   reentering the second storage cavity by drilling through the plug above the second storage cavity; and
   reentering the first storage cavity by drilling into the first storage cavity.

2. The method of claim 1 wherein developing the first storage cavity by circulating water through the leaching casing annulus with the water returning through the leaching casing comprises
   injecting a blanket fluid into the blanket casing annulus thereby displacing water out of the blanket casing annulus and creating an interface between the blanket fluid and the water at the bottom of the blanket casing;
   creating a roughly cylindrical core cavity by circulating raw water through the leaching casing with the water returning to the surface through the leaching casing annulus and continuing to circulate the raw water until the cylindrical core cavity is created;
   repositioning the leaching casing so that the bottom of the leaching casing is between the top and bottom of the roughly cylindrical core cavity and below the bottom of the blanket casing;
   creating the first storage cavity by circulating raw water through the leaching casing annulus with the water returning through the leaching casing; and
   displacing out the blanket fluid after the first storage cavity is created.

3. The method of claim 1 wherein developing the second storage cavity by circulating water through the leaching casing annulus with the water returning through the leaching casing comprises
   injecting a blanket fluid into the blanket casing annulus thereby displacing water out of the blanket casing annulus and creating an interface between the blanket fluid and the water at the bottom of the blanket casing;
   creating a cylindrical core cavity by circulating raw water through the leaching casing with the water returning to the surface through the leaching casing annulus and continuing to circulate the raw water until the roughly cylindrical core cavity is created;
   repositioning the leaching casing so that the bottom of the leaching casing is between the top and bottom of the cylindrical core cavity;
   creating the second storage cavity by circulating raw water through the leaching casing annulus with the water returning through the leaching casing; and
   displacing out the blanket fluid after the second storage cavity is created.

4. The method of using salt deposits for storage comprising
   drilling a well into the salt deposit;
   creating a storage cavity in the salt deposit by circulating raw water through the well;
   wherein evacuating the storage cavity of all liquids includes
   running liner casing with packoff means in the well;
   setting the packoff means in the well bore;
   running dewatering casing with pump means to the bottom of the storage cavity and inside the liner casing;
   activating the pump means to pump fluid out of the storage cavity;
   removing the dewatering casing with pump means from the well when the fluid has been pumped out of the storage cavity;
   releasing the packoff means; and
   removing the liner casing and packoff means from the well;
   injecting storage material into the storage cavity; and
   sealing the storage cavity by setting a plug in the well above the top of the storage cavity.

5. The method of claim 4 wherein creating a storage cavity in the salt deposit by circulating raw water through the well includes
   running blanket casing in the well so as to extend from the surface into the salt deposit;
   running leaching casing inside the blanket casing so that the leaching casing extends from the surface to below the bottom of the blanket casing thereby creating a leaching casing annulus between the leaching casing and the blanket casing;
   developing the storage cavity by circulating water through the leaching casing annulus with water returning through the leaching casing;
   removing the leaching casing from the well; and
   removing the blanket casing from the well.

6. The method of claim 5 wherein sealing the storage cavity by setting a plug above the top of the storage cavity includes
   selecting the depth of the plug;
   running pipe into the well so as to extend from the surface to the selected plug depth;
   pumping a cement slurry through the pipe and out of the pipe so as to place the cement in the well at the selected plug depth; and
   removing the pipe from the well.

7. The method of using salt deposits for storage comprising
   drilling a well into a salt deposit;
   creating a first storage cavity in the salt deposit by circulating raw water in the well;
   evacuating the first storage cavity of all liquids;
   injecting storage material into the first storage cavity;
   sealing the first storage cavity by setting a plug in the well above the top of the first storage cavity;
   creating a second storage cavity in the salt deposit above the plug by circulating raw water in the well;

evacuating the second storage cavity of all liquids;

injecting storage material into the second storage cavity; and sealing the second storage cavity by setting a plug in the well above the top of the second storage cavity.

8. The method of claim 7 wherein creating the first storage cavity in the salt deposit by circulating raw water in the well includes running blanket casing in the well so as to extend from the surface into the salt deposit;

running leaching casing inside the blanket casing so as the leaching casing extends from the surface to below the bottom of the blanket casing thereby creating a leaching casing annulus between the leaching casing and the blanket casing;

developing first storage cavity by circulating raw water through the leaching casing annulus with the water returning through the leaching casing;

removing the leaching casing from the well;

removing the blanket casing from the well.

9. The method of using salt deposits for storage comprising drilling a well into a salt deposit;

running blanket casing in the well so as to extend from the surface into the salt deposit;

running leaching casing inside the blanket casing so that the leaching casing extends from the surface to below the bottom of the blanket casing thereby creating a leaching casing annulus between the leaching casing and the blanket casing;

injecting a blanket fluid into the blanket casing annulus thereby displacing water out of the blanket casing annulus and creating an interface between the blanket fluid and the water at the bottom of the blanket casing;

creating a roughly cylindrical core cavity by circulating raw water through the leaching casing with the water returning to the surface through the leaching casing annulus and continuing to circulate the raw water until the cylindrical core cavity is created;

repositioning the leaching casing so that the bottom of the leaching casing is between the top and bottom of the roughly cylindrical core cavity and below the bottom of the blanket casing;

creating the first storage cavity by circulating raw water through the leaching casing annulus with the water returning through the leaching casing;

displacing the blanket fluid after the first storage cavity is created;

removing the leaching casing from the well;

removing the blanket casing from the well;

evacuating the first storage cavity of all liquids;

injecting storage material into the first storage cavity;

sealing the first storage cavity by setting a plug in the well above the top of the first storage cavity;

creating a second storage cavity in the salt deposit above the plug by circulating raw water in the well;

evacuating the second storage cavity of all liquids;

injecting storage material into the second storage cavity; and sealing the second storage cavity by setting a plug in the well above the top of the second storage cavity.

10. The method of claim 9 wherein evacuating the first storage cavity of all liquids includes running liner casing with packoff means in the well;

setting the packoff means in the well bore above the top of the first storage cavity;

running dewatering casing with pump means to the bottom of the first storage cavity and inside the liner casing;

activating the pump means to pump liquids out of the well;

removing the dewatering casing with pump means from the well when the liquids have been pumped out of the well;

releasing the packoff means; and removing the liner casing and packoff means from the well.

11. The method of claim 10 wherein sealing the first storage cavity by setting the plug above the top of the first storage cavity includes selecting a depth to set a plug above the top of the first storage cavity;

running pipe into the well so as to extend from the surface to the selected plug depth;

pumping a cement slurry through the pipe and out of the pipe so as to place the cement in the well at selected plug depth; and removing the pipe from the well.

12. The method of claim 11 wherein creating a second storage cavity in the salt deposit above the plug by circulating raw water through the well includes running blanket casing in the well so as to extend to the surface into the salt deposit to a point above the plug;

running leaching casing inside the blanket casing so that the leaching casing extends from the surface to below the bottom of the blanket casing thereby creating a leaching casing annulus between the leaching casing and the blanket casing;

developing a second storage cavity by circulating water through the leaching casing annulus with water returning to the surface through the leaching casing;

removing the leaching casing from the well; and removing the blanket casing from the well.

13. The method of claim 12 wherein developing the second storage cavity by circulating water through the leaching casing annulus with the water returning through the leaching casing comprises injecting a blanket fluid into the blanket casing annulus thereby displacing water out of the blanket casing annulus and creating an interface between the blanket fluid and the water at the bottom of the blanket casing;

creating a cylindrical core cavity by circulating raw water through the leaching casing with the water returning to the surface through the leaching casing annulus and continuing to circulate the raw water until the roughly cylindrical core cavity is created;

repositioning the leaching casing so that the bottom of the leaching casing is between the top and bottom of the cylindrical core cavity;

creating the second storage cavity by circulating raw water through the leaching casing annulus with the water returning through the leaching casing; and displacing out the blanket fluid after the second storage cavity is created.

14. The method of claim 13 wherein evacuating a second storage cavity of all liquids includes running a liner casing with packoff means in the well;

setting the packoff means in the well bore at a point above the top of the second cavity;

running dewatering casing with pump means to the bottom of the second storage cavity and inside the liner casing;

activating pump means to pump liquid out of the second storage cavity;

removing the dewatering casing with pump means from well when the liquids have been pumped out of the well;

releasing packoff means; and removing the liner casing and the packoff means from the well.

15. The method of claim 14 wherein sealing the second storage cavity by setting the plug above the top of the second storage cavity includes selecting a depth to set the plug;

running pipe into the well so as to extend from the surface to the selected plug depth;

pumping a cement slurry through the pipe and out of the pipe so as to place the cement in the well at the selected plug depth; and removing the pipe from the well.

16. The method of using a salt deposit for storage comprising drilling a well into the salt deposit;

creating a first storage cavity in the salt deposit while circulating raw water through the well;

evacuating the first storage cavity of liquids;

injecting gas into the storage cavity to build up pressure to a desired level;

injecting storage material into the first storage cavity;

releasing gas from the first storage cavity as storage material is injected into the first storage cavity to maintain pressure at the desired level;

sealing the first storage cavity by setting a plug in the well above the top of the first storage cavity;

creating a second storage cavity in the salt deposit above the plug by circulating raw water through the well;

evacuating the second storage cavity of liquid;

injecting gas into the second storage cavity to build up pressure to a desired level;

injecting storage material into the second storage cavity;

releasing gas from the second storage cavity as storage material is injected into the second storage cavity;

sealing the second storage cavity by setting a plug in the well above the top of the second storage cavity;

re-entering the second storage cavity by drilling through the plug above the second storage cavity; and re-entering the first storage cavity by drilling into the first storage cavity.

17. The method of claim 16 wherein re-entering the first storage cavity by drilling into the first storage cavity includes drilling a directional well into the salt deposit to an entry point at the lower part of the first storage cavity.

18. The method of using salt deposits for storage comprising drilling a well into a salt deposit;

running blanket casing in the well, thereby creating a blanket casing annulus between the blanket casing and the well;

running leaching casing inside the blanket casing, with the end of the leaching casing extending below the bottom of the blanket casing, thereby creating a leaching casing annulus between the leaching casing and the blanket casing;

injecting a blanket fluid into the blanket fluid into the blanket casing annulus thereby displacing water out of the blanket casing annulus and creating an interface between the blanket fluid and the other fluid in the well;

creating a storage cavity by circulating water through the leaching casing and the leaching casing annulus, the top of said cavity being controlled by the position of the interface; and evacuating the cavity of liquids prior to storing material in the cavity.

19. The method of claim 18 including injecting storage material into the storage cavity.

20. The method of claim 19 including sealing the storage cavity and creating a second storage cavity in the salt deposit above the storage cavity.

21. The method of claim 20 including evacuating the second storage cavity of all liquids;

injecting storage material into the second storage cavity; and sealing the second storage cavity by setting a plug in the well above the top of the second storage cavity.

22. The method of claim 18 including creating a roughly cylindrical core cavity prior to creating the storage cavity, the roughly cylindrical core cavity being created by circulating water through the leaching casing and leaching casing annulus; and repositioning the bottom of leaching casing prior to creating the storage cavity to a position which is between the top and bottom of the roughly cylindrical core cavity and below the bottom of the blanket casing.

* * * * *